United States Patent
Hills et al.

(10) Patent No.: US 10,620,920 B2
(45) Date of Patent: Apr. 14, 2020

(54) AUTOMATIC GRAPHICAL USER INTERFACE GENERATION FROM NOTIFICATION DATA

(71) Applicant: Google Inc., Mountain View, CA (US)

(72) Inventors: Alexander Hills, Cambridge, MA (US); Nathan Dickerson Beach, Cambridge, MA (US); Daniel George Koulomzin, Jamaica Plain, MA (US); Joao Paulo Gil de Paiva, Menlo Park, CA (US); Matias Gonzalo Duarte, Mountain View, CA (US); Brett Lider, San Francisco, CA (US); Morten Just Petersen, San Francisco, CA (US); Jeffrey Hoefs, San Francisco, CA (US)

(73) Assignee: Google LLC, Mountain View, CA (US)

( * ) Notice: Subject to any disclaimer, the term of this patent is extended or adjusted under 35 U.S.C. 154(b) by 260 days.

(21) Appl. No.: 15/157,064

(22) Filed: May 17, 2016

(65) Prior Publication Data

US 2017/0337045 A1 Nov. 23, 2017

(51) Int. Cl.
| | | |
|---|---|---|
| *G06F 8/38* | (2018.01) | |
| *G06F 3/0484* | (2013.01) | |
| *G06F 9/451* | (2018.01) | |
| *H04L 12/58* | (2006.01) | |
| *G06F 9/445* | (2018.01) | |

(52) U.S. Cl.
CPC ............ *G06F 8/38* (2013.01); *G06F 3/04842* (2013.01); *G06F 9/445* (2013.01); *G06F 9/451* (2018.02); *H04L 51/046* (2013.01); *H04L 51/24* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 8,103,735 B2* | 1/2012 | Adams | H04M 1/72552 709/206 |
| 8,738,723 B1 | 5/2014 | Faaborg et al. | |
| 2005/0144266 A1* | 6/2005 | Antonelli | H04L 29/06 709/223 |
| 2006/0009205 A1 | 1/2006 | Hirata | |

(Continued)

FOREIGN PATENT DOCUMENTS

| | | |
|---|---|---|
| DE | 102014118959 A1 | 7/2015 |
| EP | 1638028 A2 | 3/2006 |
| WO | 2009033533 A1 | 3/2009 |

OTHER PUBLICATIONS

International Search Report and Written Opinion of International Application No. PCT/US2017/024330, dated Jun. 7, 2017, 15 pp.

(Continued)

*Primary Examiner* — Christopher J Fibbi
(74) *Attorney, Agent, or Firm* — Shumaker & Sieffert, P.A.

(57) ABSTRACT

A computing device is described that receives notification data, and selects, based on the notification data, a template graphical user interface (GUI) view from a plurality of template GUI views. The computing device automatically generates, from a portion of the notification data, an application GUI view that includes the portion of the notification data included within one or more fields of the template GUI view. The computing device outputs, for display, the application GUI view.

20 Claims, 7 Drawing Sheets

(56) References Cited

U.S. PATENT DOCUMENTS

| | | | |
|---|---|---|---|
| 2008/0209078 A1 | 8/2008 | Bates et al. | |
| 2010/0211872 A1* | 8/2010 | Rolston | G06F 3/0482 715/702 |
| 2013/0132899 A1* | 5/2013 | Scott | G06F 3/03549 715/810 |
| 2013/0151943 A1* | 6/2013 | Zhu | G06F 17/3089 715/234 |
| 2013/0346922 A1* | 12/2013 | Shiplacoff | G06F 3/04842 715/835 |
| 2015/0193090 A1 | 7/2015 | Grover et al. | |
| 2015/0301990 A1 | 10/2015 | Karp et al. | |
| 2015/0341903 A1* | 11/2015 | Jeong | H04W 68/02 455/458 |
| 2017/0054670 A1* | 2/2017 | Lee | H04L 51/24 |
| 2017/0277361 A1* | 9/2017 | Schulze | G06F 9/451 |

OTHER PUBLICATIONS

Response to Written Opinion dated Jun. 7, 2017 from International Application No. PCT/US2017/024330, filed Feb. 26, 2018, 17 pp.
Second Written Opinion of International Application No. PCT/US2017/024330, dated Apr. 3, 2018, 10 pp.
Response to Written Opinion dated Apr. 3, 2018, of International Application No. PCT/US2017/024330, filed May 23, 2018, 14 pp.
Notification Concerning Information Communication with the Applicant of International Application No. PCT/US2017/024330, dated Aug. 9, 2018 5 pp.
Response to Communication dated Aug. 9, 2018, of International Application No. PCT/US2017/024330, filed Aug. 10, 2018, 10 pp.
International Preliminary Report on Patentability of International Application No. PCT/US2017/024330, dated Sep. 5, 2018, 15 pp.
Intent to Grant dated Jul. 29, 2019, from counterpart European Application No. 17717580.9, 50 pp.
Office Action, and translation thereof, from counterpart German Application No. 102017108636.6, dated Feb. 25, 2019, 12 pp.
Communication under Rule 71(3) EPC dated Feb. 28, 2019, from counterpart European Application No. 17717580.9, 49 pp.
Response to Communication under Rule 71(3) EPC dated Feb. 28, 2019, from counterpart European Application No. 17717580.9, filed Jun. 24, 2019, 13 pp.
Communication under Rule 71(3) EPC dated Jul. 29, 2019, from counterpart European Application No. 17717580.9, 50 pp.

* cited by examiner

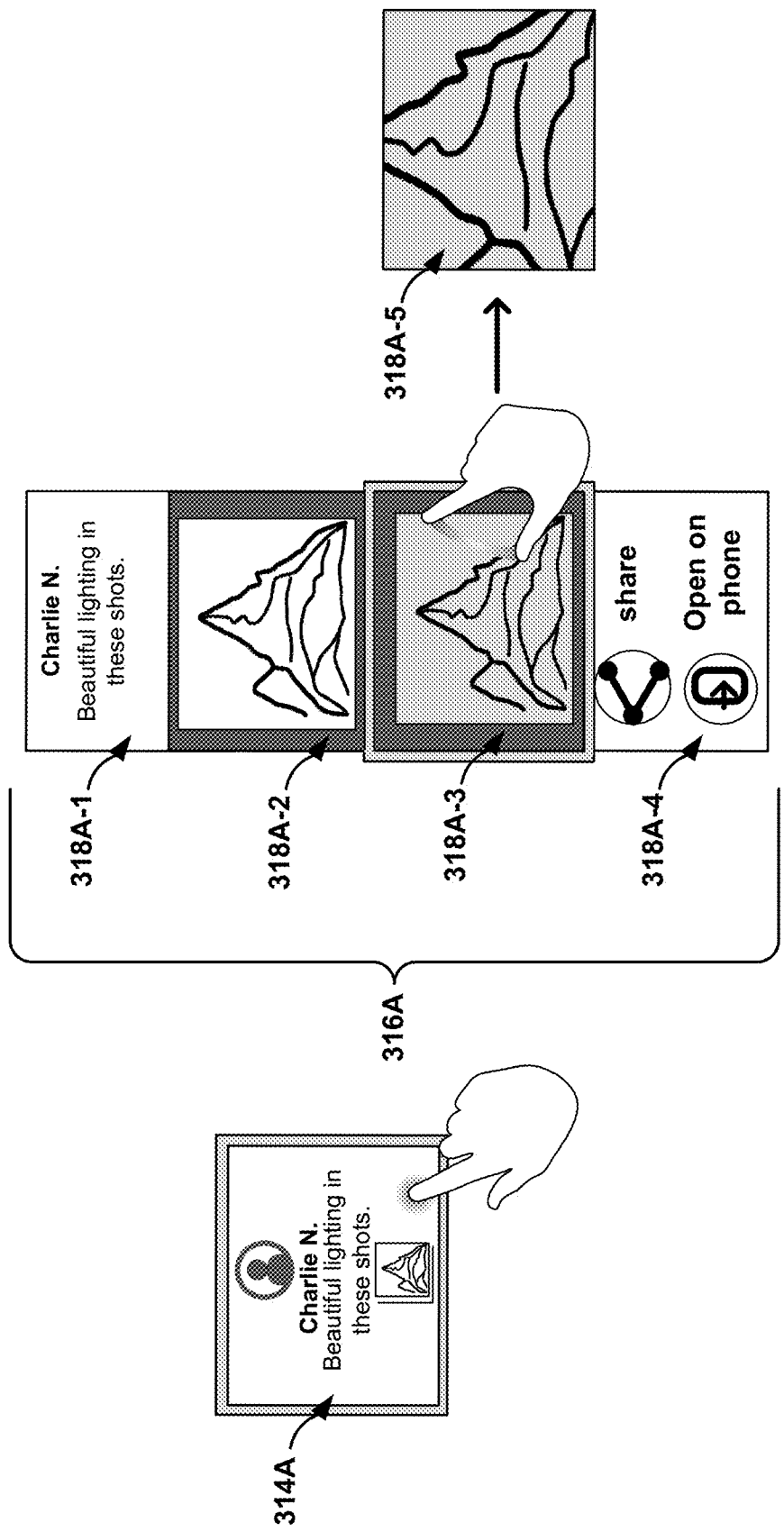



AUTOMATIC GRAPHICAL USER INTERFACE GENERATION FROM NOTIFICATION DATA

BACKGROUND

With technology constantly evolving, and the market viability of new technology being uncertain, some developers may wish to avoid spending resources to update or develop a new mobile application for use with an emerging platform and/or a new type of device. For example, while an application developer may create an application for an existing desktop, mobile phone, or tablet computing platform, some application developers may be unable (e.g., for lack of understanding of the technology) or unwilling (e.g., for lack of funding, human resources, etc.) to also develop a similar application for a new wearable or automotive computing platform.

SUMMARY

In one example, a method includes receiving, by a computing device, notification data, selecting, by the computing device, based on the notification data, a template graphical user interface (GUI) view from a plurality of template GUI views, and automatically generating, by the computing device, from a portion of the notification data, an application GUI view that includes the portion of the notification data included within one or more fields of the template GUI view. The method further includes outputting, by the computing device, for display, the application GUI view.

In another example, a computing device includes a display component configured to display information, an input component configured to receive user input, at least one processor, and a memory. The memory includes instructions that, when executed, cause the at least one processor to: receive notification data, select, based on the notification data, a template graphical user interface (GUI) view from a plurality of template GUI views, and automatically generate, from a portion of the notification data, an application GUI view that includes the portion of the notification data included within one or more fields of the template GUI view. The instructions, when executed, further cause the at least one processor to output, for display, using the display component, a graphical alert that the notification data was received, receive, via the input component, an indication of user input associated with the graphical alert, and responsive to receiving indication of the user input, replace the graphical alert with the application GUI view.

In an additional example, a computer-readable storage medium comprising instructions that, when executed, cause one or more processors of a computing device to receive notification data, select, based on the notification data, a template graphical user interface (GUI) view from a plurality of template GUI views, and automatically generate, from a portion of the notification data, an application GUI view that includes the portion of the notification data included within one or more fields of the template GUI view. The instructions, when executed, further cause the one or more processors of the computing device to output, for display, the application GUI view.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIGS. 3A-3D are conceptual diagrams illustrating example application GUI views automatically generated by an example computing device based on a portion of notification data, in accordance with one or more aspects of the present disclosure.

DETAILED DESCRIPTION

Figure 1:
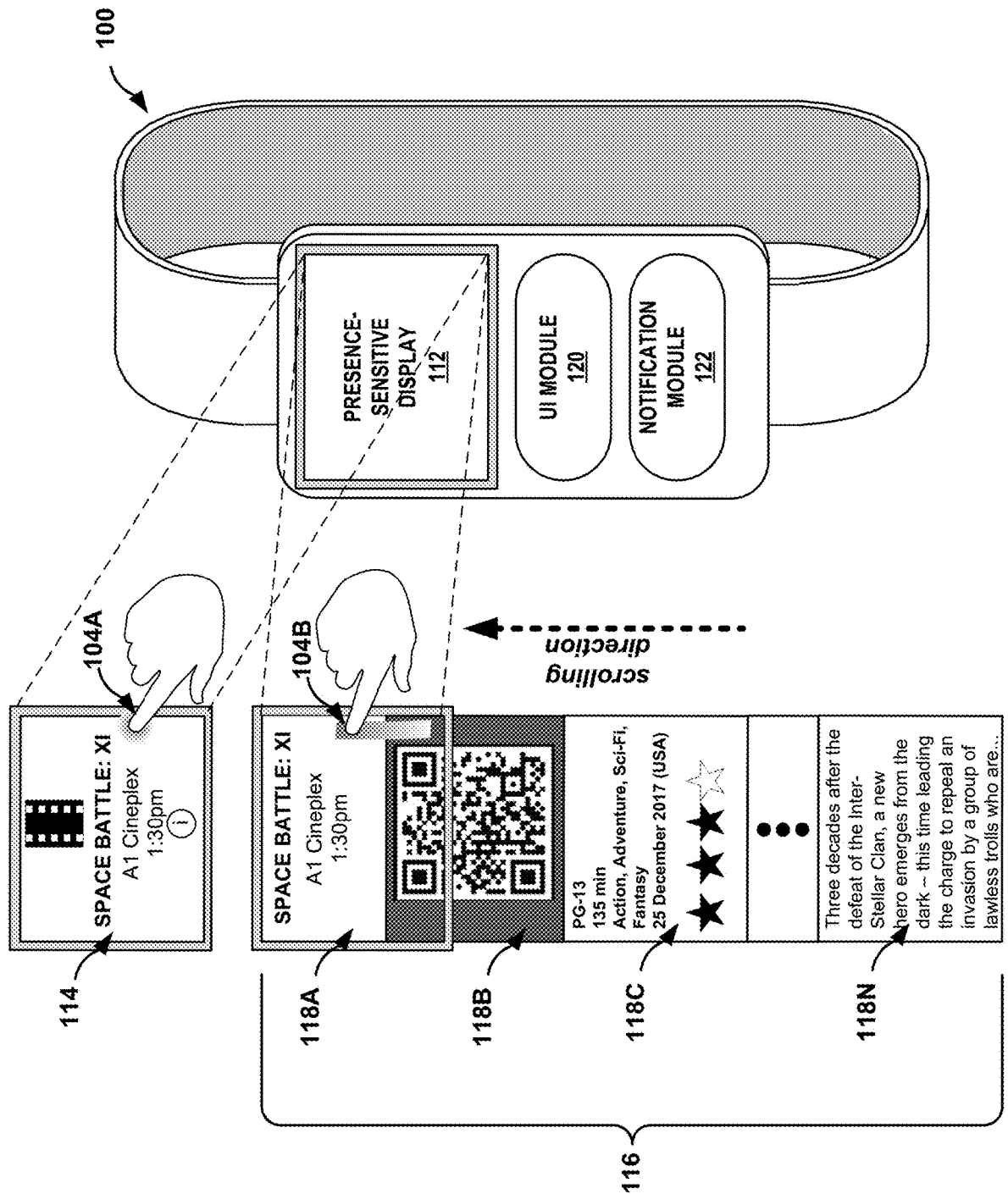
FIG. 1 is a conceptual diagram illustrating an example computing device configured to automatically generate an application graphical user interface (GUI) view based on a portion of notification data, in accordance with one or more aspects of the present disclosure.

In general, techniques of this disclosure may enable a computing device to automatically generate, from notification data, a graphical user interface (GUI) that resembles and functions similar to a GUI of a comparable standalone application without actually having to execute such a standalone application. For example, a computerized watch and a mobile phone may each receive, via notification service, separate instances of the same messaging data. While a messaging application executing at the mobile phone may present a messaging GUI from which a user can interact with the messaging data, the example computerized watch need not execute a similar messaging application to provide similar access to the data. Instead, the operating system of the example computerized watch may analyze the messaging data upon receipt of that data and invoke a new system thread to automatically generate, in real-time, a customized GUI that the watch has specifically tailored for conveying and facilitating user interactions with the data. Subsequently, when new notification data is received, the example computerized watch may stop the new thread to cease presenting the customized messaging GUI, and may invoke yet another new system thread to automatically generate, in real-time, a new customized GUI that the device has specifically tailored for conveying and facilitating user interactions with the new notification data. In this way, the example computing device may automatically provide tailored user experiences for interacting with notification data without having to execute multiple different on-device applications to convey similar information.

By relying only on information obtained from an already existing notification service, and built-in templates base on appealing GUI design, the example computing device may improve user engagement with notification data while simultaneously reducing developer time and resources to obtain similar user engagement. That is, developers need not invest time and resources creating, marketing, and supporting new applications that execute at the example computing device to effectuate the kind of application user experience that user may be used to. In addition, the example computing device need not waste memory and valuable processing overhead, by storing and later executing several different on-device applications to handle the several different types of notification data that the example computing device may receive. By not having to store instructions for, and not having to launch individual applications to provide application specific GUIs, the example computing device may conserve memory resources, execute faster, perform fewer operations, and require less infrastructure to provide a GUI experience that previously required on-device storage and execution of multiple custom or feature specific applications.

As used throughout the disclosure, the term "notification data" is used to describe various types of information that may indicate the occurrence of an event associated with various platforms, applications, and services executing within a computing system or execution environment, including at one or more computing devices. For example, notification data may include, but is not limited to, information specifying an event such as: the receipt of a communication message (e.g., e-mail, instant message, SMS, etc.) by a messaging account associated with a user of a computing devices, the receipt of information by a social networking account associated with a user of a computing device, a reminder of a calendar event (e.g., meetings, appointments, etc.) associated with a calendar account of a user of a computing devices, information generated and/or received by a third-party application executing at a computing device or in communication with a computing device, the transmittal and/or receipt of inter-component communications between two or more components of platforms, applications, and/or services executing at a computing devices, etc.

FIG. 1 is a conceptual diagram illustrating an example computing device configured to automatically generate an application graphical user interface (GUI) view based on a portion of notification data, in accordance with one or more aspects of the present disclosure. In the example of FIG. 1, computing device 100 is a wearable computing device (e.g., a computerized watch or so-called smart watch device). In general, computing device 100 may be any computing device configured to receive notification data and display graphical information associated with received notification data. For instance, computing device 100 may represent a smart phone, a tablet computer, a laptop computer, computerized eyewear, computerized gloves, or any other type of portable computing device. Additional examples of computing device 100 include desktop computers, televisions, personal digital assistants (PDA), portable gaming systems, media players, e-book readers, mobile television platforms, automobile computing systems, vehicle (e.g., automobile, aircraft, or other vehicle) cockpit displays, or any other types of wearable and non-wearable, mobile or non-mobile computing devices that may output a graphical keyboard for display.

Computing device 100 includes a presence-sensitive display (PSD) 112, UI module 120, and notification module 122. Modules 120 and 122 may perform operations described using software, hardware, firmware, or a mixture of hardware, software, and firmware residing in and/or executing at computing device 100. One or more processors of computing device 100 may execute instructions that are stored at a memory or other non-transitory storage medium of computing device 100 to perform the operations of modules 120 and 122. Computing device 100 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 100 may function as respective input and/or output devices for computing device 100. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 100.

PSD 112 may detect input (e.g., touch and non-touch input) from a user of respective computing device 100. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114, user interface 116, etc.), which may be associated with functionality provided by computing device 100.

User interfaces 114 and 116 are described below in greater detail. In general, user interface 114 represents a graphical alert to notification data received by computing device 100, whereas user interface 116 represents an application-style, GUI that computing device 100 automatically generates from the notification data associated with the notification alert presented by user interface 114.

User interface 114 includes a single GUI view which presents small amount information that computing device 100 deems sufficient to alert the user of the notification data. For example, as shown in FIG. 1, computing device 100 may a reminder of a calendar event (e.g., a movie showing) as notification data and output a GUI view as part of user interface 114 that shows the title/name, time, and location of the calendar event.

As used herein, the term "GUI view" is meant to describe a discrete screen, layer, page, window, or portion of related content of a GUI. In some examples, only one GUI view may be displayed at a time. In other examples, more than one GUI view may be displayed at a time. A grouping of GUI views may represent a single GUI.

In contrast to user interface 114, user interface 116 is a richer GUI that includes several GUI views that each present, in different ways, information obtained from the notification data including in some example, selectable graphical elements that enable user interaction with the data. For example, as shown in FIG. 1, computing device 100 automatically generate user interface 116 and output GUI views 118A-118N (collectively GUI views 118) as part of user interface 116 that each show different information about the calendar event. GUI view 118A is similar to the GUI view of user interface 114 showing high-level information about the calendar event (e.g., title/name, notification icon, time, location, etc.). GUI view 118B includes a graphical image attachment representing a Matrix barcode or barcode from an electronic ticket associated with the calendar event. GUI view 118C includes more detailed information about the event (e.g., message, body, content, ratings, reviews, duration, etc.) and GUI view 118D includes even more detailed information about the event (e.g., message history, additional body, additional content, a description or summary).

Notification module 122 may perform functions associated with receiving, managing, and otherwise handling at least a portion of the notification data generated and/or received by platforms, applications, and services executing at, or in communication with, computing device 100. As used throughout the disclosure, the term "notification data" is used to describe various types of information that may indicate the occurrence of an event associated with various platforms, applications, and services executing within, or in communication with, an execution environment at one or more computing devices, such as computing device 100. For example, notification data may include, but is not limited to, information specifying an event such as: the receipt of a communication message (e.g., e-mail, instant message, text message, etc.) by a messaging account associated with computing device 100, the receipt of information by a social networking account associated with computing device 100, a reminder of a calendar event (meetings, appointments, etc.) associated with a calendar account of computer device 100, information generated and/or received by a third-party application executing at or in communication with computing device 100, the transmittal and/or receipt of inter-component communications between two or more components of platforms, applications, and/or services executing at computing device 100, or any other information that may interest a user.

Notification module 122 may process notification data as computing device 100 receives the notification data from any device, server, or service, executing at or in communication with computing device 100 and distribute portions of the notification data to other modules, applications, and/or services executing at or in communication with computing device 100. For example, notification module 122 may receive notification data from a mobile phone that is paired via a network connection with computing device 100. The notification data may include information about an event (e.g., a reminder about a movie showing that a user of computing device 100 has purchased tickets to) from a calendar application executing at the mobile phone. In response to receiving the notification data, notification module 122 may send at least a portion of the notification data to UI module 120 along with an instruction for presenting, at PSD 112, a graphical indication or alert based on the notification data.

In some examples, notification module 122 may implement a notification queue for processing notification data. Notification module 122 may place received notification data into the notification queue in a particular order (e.g., first-in-first-out, last-in-first-out, etc.). Notification module 122 may give other applications, services, modules, or platforms executing at computing device 100 access to the notification queue. In this way, notification module 122 need only provide a location in memory to the notification queue and the other applications, services, platforms, or modules executing at computing device 100 can access incoming notification data directly. For example, UI module 120 may receive a pointer from notification client module 122 indicating the location of notification queue in a memory of computing device 100. UI module 120 may retrieve and analyze the notification data in the notification queue to create one or more GUI views of user interfaces 114 or 116 of FIG. 1.

In general, UI module 120 may manage the interactions with, and control the display of, user interfaces (e.g., user interfaces 114 and 116) being presented at PSD 112. For example, UI module 120 may receive information (e.g., notification data) and/or instructions from various sources (e.g., one or more system platforms, operating systems, applications, modules, and/or services executing at or in communication with computing device 100) for generating user interfaces 114 and 116 and in response, output instructions and information to PSD 112 to cause PSD 112 to display user interfaces 114 and 116. In addition, UI module 120 may receive information from PSD 112 in response to inputs detected by PSD 112 at locations at which user interfaces 114 and 116 are displayed; and disseminate information about the inputs to various destinations (e.g., one or more system platforms, operating systems, applications, modules, and/or services executing at or in communication with computing device 100) for interpreting the input and for causing computing device 100 to perform a function. In some examples, UI module 120 may receive explicit instructions from a source for generating a user interface that is displayed by PSD 112. However, in other cases, UI module 120 may receive other information (e.g., notification data) and automatically generate a user interface that is displayed by PSD 112 based on the other information.

UI module 120 may automatically generate, from notification data obtained by notification module 122, a GUI that functions and appears similar to a GUI (e.g., for conveying and facilitating user interactions with the notification data) that might be generated by an application executing at computing device 100 if such an application actually existed. UI module 120 may analyze notification data upon its receipt and automatically generate, in real-time, a customized GUI that UI module 120 has specifically tailored for conveying and facilitating user interactions with the notification data. For example, upon receipt of notification data, UI module 120 may select, from amongst several different "template GUI views", a particular template GUI view to use for presenting a portion of the notification data. UI module 120 may choose several GUI views if necessary (e.g., one view for each different portion of notification data) and populate each selected, template GUI view with a respective portion of the notification data. UI module 120 may then group and cause PSD 112 to present the populated template GUI views as a cohesive application-style, customized GUI.

Subsequently, when new notification data is received, UI module 120 may present the old customized GUI, and again, automatically generate, in real-time, a new customized GUI that the device has yet again specifically tailored for conveying and facilitating user interactions with the new notification data. In this way, UI module 120 may enable computing device 100 to automatically provide tailored user experiences for interacting with notification data received by computing device 100, without requiring computing device 100 to execute multiple applications that other devices may use to convey similar information.

In the example illustrated in FIG. 1, notification module 122 of computing device 100 may receive notification data that includes information about a movie showing for which a user of computing device 100 had earlier purchased an electronic ticket. Notification module 122 may store the notification data (e.g., in a notification queue) and send an alert or other information to UI module 120 that alerts UI module 120 to the receipt of the new notification data. UI module 120 may format a portion of the notification data into a graphical alert and cause PSD 112 to present the graphical alert as user interface 114.

Computing device 100 may select, based on the notification data, a template GUI view from a plurality of template GUI views. For example, UI module 120 may dissect the notification data into one or more content pages, content layers, or portions of notification data and select a particular template GUI view that is best suited for presenting each portion of notification data. UI module 120 may rely on a flag or other identifier within the notification data itself to determine a content type associated with each portion of notification data. In some examples, UI module 120 may analyze the notification data (e.g., parse text, identify elements, identify images, determine attributes, etc.) and select an appropriate template GUI view to present the content portion accordingly.

Computing device 100 may automatically generate, from a portion of the notification data, an application GUI view that includes the portion of the notification data included within one or more fields of the template GUI view. For example, UI module 120 may identify from the notification data, a summary portion of the notification data including a notification icon, a title/name, and other information and generate GUI view 118A to be a graphical representation of the information contained in the summary portion. UI module 120 may populate the title/name field of a summary template GUI view with the title/name contained in the summary portion of the notification data. UI module 120 may populate the notification icon field of the summary template GUI view with the notification icon in the summary portion of the notification data. UI module 120 may populate the time and location fields of the summary template GUI view with the time and location information contained in the summary portion of the notification data.

UI module 120 may repeat the above steps, selecting a template GUI view and populating the template GUI view for each portion of notification data. For example, UI module 120 may populate an image template GUI view with an image from the notification data to generate GUI view 118B. UI module 120 may populate a message or body template GUI view with one or more message or content portions from the notification data and generate GUI views 118C-118N that each includes a graphical representation the information contained in each of the one or more message or content portions.

After UI module 120 causes PSD 112 to present user interface 114, a user of computing device 100 may provide touch input 104 at a location of PSD 112 at which user interface 114 is displayed. UI module 120 may interpret touch input 104 as a command for computing device 100 to show more information about the movie showing.

Computing device 100 may output, for display, the application GUI view. For example, after populating all the fields of the different template GUI views with portions of notification data, UI module 120 may render the multiple template GUI views and send instructions to PSD 112 to present the rendered GUI views as user interface 116. UI module 120 may package the rendered GUI views during rendering such that when PSD 112 presents the rendered GUI views, the rendered GUI views are output for display with the appearance of being part of a single, stand-alone application that is specific to the notification data. For example, as shown in FIG. 1, UI module 120 may package the populated GUI templates associated with each of GUI views 118 and cause PSD 112 to display GUI views 118 as a single user interface 116. A user may provide gesture input 104B (e.g., a sliding touch input) to cause PSD 112 to scroll from one GUI view 118 to the next GUI view 118.

In this way, computing device 100 may automatically provide tailored user experiences for interacting with notification data without having to execute multiple different on-device applications to convey similar information. By relying on template GUI views that have been preloaded to computing device 100 and comport with accepted standards for appealing GUI design, computing device 100 may improve user engagement with notification data while simultaneously reducing developer time and resources to obtain similar user engagement. By not having to store instructions for, and launching individual applications to provide application specific GUIs, computing device 100 may conserve memory resources, execute faster, perform fewer operations, and require less infrastructure to provide a GUI experience that previously required on-device storage and execution of multiple custom or feature specific applications.

Figure 2:
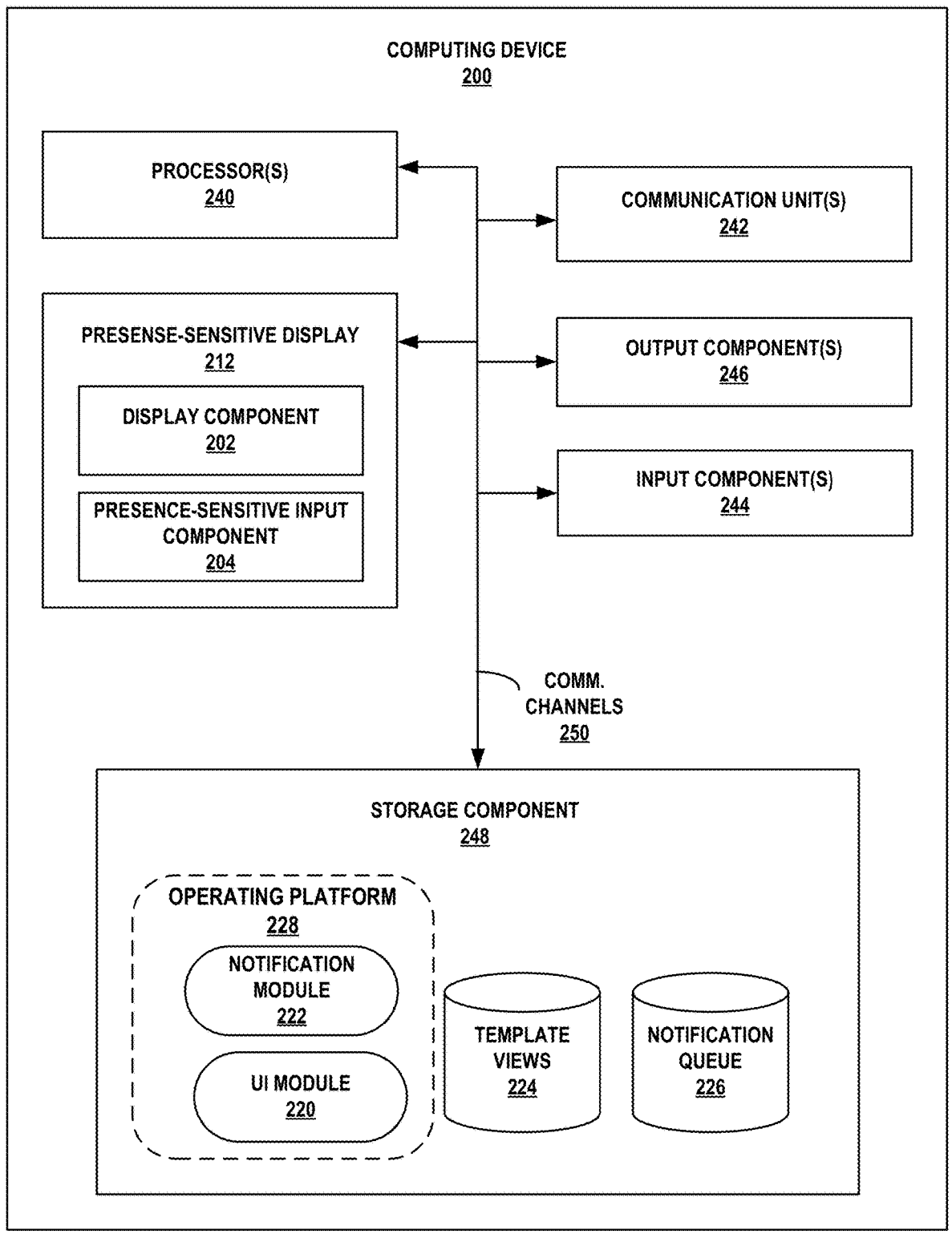
FIG. 2 is a block diagram illustrating an example computing device configured to automatically generate an application GUI view based on a portion of notification data, in accordance with one or more aspects of the present disclosure.

FIG. 2 is a block diagram illustrating an example computing device configured to automatically generate an application GUI view based on a portion of notification data, in accordance with one or more aspects of the present disclosure. Computing device 200 of FIG. 2 is described below as an example of computing device 100 of FIG. 1. FIG. 2 illustrates only one particular example of computing device 200, and many other examples of computing device 200 may be used in other instances and may include a subset of the components included in example computing device 200 or may include additional components not shown in FIG. 2.

As shown in the example of FIG. 2, computing device 200 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 200 include operating platform 228 (also referred to as operating system 228), UI module 220, notification module 222, template views data store 224 (referred to simply as "template views 224"), and notification queue data store 226 (referred to simply as "notification queue 226"). Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 200 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers. Computing device 200 may receive, via communication units 242, notification data being broadcast or transmitted via a network from other computing devices communicating on the network. For example, computing device 200 may receive, using communication unit 242, notification data from an application executing at a different computing device that shares a communication link (e.g., is communicating on the same network as) computing device 200. Computing device 200 may be a wearable device or an automotive device and the "different" computing device from which the notification data is received may be a mobile telephone, laptop computer, tablet computing device, or any and all other computing devices, servers, and computing systems.

One or more input components 244 of computing device 200 may receive input. Examples of input are tactile, audio, and video input. Input components 244 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 200 may generate output. Examples of output are tactile, audio, and video output. Output components 246 of computing device 200, in one example, includes a PSD, sound card, video graphics adapter card, speaker, cathode ray tube (CRT) monitor, liquid crystal display (LCD), or any other type of device for generating output to a human or machine.

PSD 212 of computing device 200 is an input and output device of computing device 200 and may be similar to PSD 112 of computing device 100. PSD 212 includes display component 202 and presence-sensitive input component 204. Display component 202 may be a screen at which information is displayed by PSD 212 and presence-sensitive input component 204 may be a touch or capacitive sensor configured to detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as user interface 114 or user interface 116 of FIG. 1).

While illustrated as an internal component of computing device 200, PSD 212 may also represent an external component that shares a data path with computing device 200 for transmitting and/or receiving input and output. For instance, in one example, PSD 212 represents a built-in component of computing device 200 located within and physically connected to the external packaging of computing device 200 (e.g., a screen on a mobile phone or a screen on a computerized watch). In another example, PSD 212 represents an external component of computing device 200 located outside and physically separated from the packaging or housing of computing device 200 (e.g., a monitor, a projector, etc. that shares a wired and/or wireless data path with computing device 200).

PSD 212 of computing device 200 may detect two-dimensional and/or three-dimensional gestures as input from a user of computing device 200. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 200. Examples of processors 240 include application processors, display controllers, auxiliary processors, one or more sensor hubs, and any other hardware configure to function as a processor, a processing unit, or a processing device. Operating platform 228 and modules 220 and 222 may be operable by processors 240 to perform various actions, operations, or functions of computing device 200. For example, processors 240 of computing device 200 may retrieve and execute instructions stored by storage components 248 that cause processors 240 to perform the operations of operating platform 228 and modules 220 and 222. The instructions, when executed by processors 240, may cause computing device 200 to store information within storage components 248.

One or more storage components 248 within computing device 200 may store information for processing during operation of computing device 200 (e.g., computing device 200 may store data accessed by operating platform 228 and modules 220 and 222 during execution at computing device 200). In some examples, storage component 248 is a temporary memory, meaning that a primary purpose of storage component 248 is not long-term storage. Storage components 248 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with operating platform 228 and modules 220 and 222 as well as template views data store 224 and notification queue data store 226. Storage components 248 may include a memory configured to store data or other information associated with operating platform 228 and modules 220 and 222 as well as template views data store 224 and notification queue data store 226.

Operating platform 228 manages computing resources of computing device 200. Also referred to as an operating system, operating platform 228 manages the interaction between modules 220 and 222 and components 202, 204, 212, 240, 242, 244, 246, and 248. For example, operating platform 228 may perform time-sharing or scheduling of tasks to ensure that each of modules 220 and 222 are allocated a percentage of processor time of processors 240 or may efficiently access the information stored at storage component 248, or any other of components 202, 204, 212, 242, 244, and 246. In other words, operating platform 228 may act as an intermediary between software, hardware, and firmware, executing at or accessible to computing device 200. In some examples, operating platform 228 is the only executable application of computing device 200 that generates, receives, manages, or otherwise handles notification data and the presentation thereof. For example, rather than rely on multiple, application specific programs or applications, operating platform 228 of computing device 200, using UI module 220 and notification module 222, may control all operations and functions related to notifications and the presentation of information associated with notification data at PSD 212.

Notification module 222 may include all functionality of notification module 122 of computing device 110 of FIG. 1 and may perform similar operations as notification module 222 for receiving, managing, and otherwise handling at least a portion of the notification data generated and/or received by platforms, applications, and services executing at, or in communication with, computing device 200. As shown in FIG. 2, notification module 222 may be part of or associated with operating platform 228. For example, notification module 222 may be a sub-module, service, or activity of operating platform 228 as opposed to a separate module or application of computing device 200.

Notification module 222 may receive notification data (e.g., as information obtained by communication units 242 from a different computing device, as information obtained from an application executing at computing device 200, etc.) and store the notification data at notification queue 226. Notification module 222 may output portions of the notification data it receives to UI module 220 and/or provide access to UI module 220 to notification queue 226. For example, notification module 222 may share with UI module 220, a memory pointer to a location of notification queue 226 within storage component 248 and allow UI module 220 to access the data stored at the location (e.g., to automatically generate GUI views based on the notification data).

Notification queue 226 represents any suitable storage medium for storing and buffering notification data. For instance, notification queue 226 may be a queue, stack, or type of data structure for buffering for organizing notification data as notification module 222 receives the notification data, over time. UI module 220 may access notification queue 226 and generate GUI views based on the notification data stored at notification queue 226. Notification module 222 may perform read/write operations for adding information to notification queue 226 (e.g., when notification data is received) or removing information from notification queue 226 (e.g., when a user provided input to dismiss a notification alert, when UI module 220 cease presenting an auto-generated GUI view associated with the notification data, etc.).

Template views 224 represents any suitable storage medium for storing and information specifying a plurality of "template GUI views" that UI module 220 relies on to automatically generate notification data specific GUIs. Each template GUI view may specify location, size, and attributes of one or more fields of graphical content that when populated with portions of notification data, may be rendered for display (e.g., at PSD 212) as a GUI view. Each template GUI view may be pre-loaded or downloaded during run-time at computing device 200 and may specify locations, sizes, and attributes of fields that provide graphical content extracted from notification data. Each template GUI view may be designed according to rules specifying how to layout a typical application GUI, what and where to locate primary and secondary actions that a user can take from the typical application GUI, where to provide access to navigation within the typical application GUI, etc. Each field of a template GUI may map to a particular field of an existing notification data application programming interface (API) such that a notification creator (e.g., an application or service executing at or in communication with computing device 200) need not provide any additional information beyond the types of information already provided when generating notification data, to ensure the notification data can be mapped to a particular template GUI view. In some examples, a notification creator can however provide additional information (e.g., images, text content, actions, etc.) beyond the types of information already provided when generating notification data, and UI module 220 ensures the additional information is mapped to a particular template GUI view. In this way, the developer of the notification data needs only to ensure that the raw or static notification data complies with the requirements of the already existing notification service and computing device 200 transforms this static information into an interactive application style user interface.

Each template GUI view stored at template views 224 may be categorized according to notification type or according to notification data type. Examples of notification type include: a message notification type, a ticket notification type, and a photo notification type. Other example notification types are calendar or event type notifications, reminder type notifications, health data or achievement type notifications, or any other category of notification. Examples of notification data types include: profile picture, notification icon, photo, image, message, body, content, title/name, headline, header, or any other type of a portion of notification data. When computing device 200 receives a particular type of notification or notification data that has a portion of notification data which is a specific type, UI module 220 can query or perform a look-up of template views 224 to identify an appropriate template GUI that matches the specific notification or notification data type.

UI module 220 may include all functionality of UI module 120 of computing device 110 of FIG. 1 and may perform similar operations as UI module 120 for managing a user interface (e.g., user interface 114) that computing device 200 provides at presence-sensitive display 212 for handling input from a user. For example, UI module 220 may automatically generate, from notification data obtained by notification module 222, a GUI (e.g., for conveying and facilitating user interactions with the notification data) that functions and appears similar to a GUI that a user would expect to see when interacting with a dedicated application executing at computing device 200. As is the case with notification module 222, UI module 220 may be part of or associated with operating platform 228. For example, UI module 220 may be a sub-module, service, or activity of operating platform 228 as opposed to a separate module or application of computing device 200.

UI module 220 may analyze notification data upon its receipt and storage at notification queue 226 and automatically generate, in real-time, a customized GUI that UI module 220 has specifically tailored for conveying and facilitating user interactions with the notification data. UI module 220 may analyze the notification data for various types of content, fit or populate the content into one or more template GUI views 224, and merge the populated template GUI views into a single GUI that UI module 220 then causes PSD 212 to output for display. For example, in response to receiving notification data, UI module 220 may select, from amongst template views 224, a particular template GUI view 224 to use for presenting a portion of the notification data. UI module 220 may select a single template GUI views 224, if necessary, for each different portion of notification data, and populate each selected, template GUI view with a respective portion of the notification data. UI module 220 may then group and cause PSD 212 to present the populated template GUI views as a cohesive application-style, customized GUI.

When selecting a template GUI view from amongst template GUI views 224, UI module 220 may first determine a notification type associated with the notification data and then query template GUI views 224 for the notification type. UI module 220 may determine the type of notification data based on one or more of a flag associated with the portion of notification data, a style identifier associated with the portion of notification data, or a type identifier associated with the notification data. For example, the notification creator (e.g., the application or service executing at or remote to computing device 200 that generated the notification data) may already populate a flag, a style identifier, or a type identifier associated with the notification data to ensure the notification data is compatible with an existing notification service being used to send and receive the notification data. In this way, UI module 220 may determine the type of the notification data for generating the GUI view based on a type flag that the originator already sets as part of the notification service, and UI module 220 need not required the originator of the notification data to provide any more information beyond what normally would be required to comply with the notification service.

In some examples, UI module 220 may analyze portions of notification data and infer a notification type. For example, if notification data includes a graphical representation of a barcode or Matrix barcode, UI module 220 may infer the notification data is a ticket type. If notification data includes text content in a format typical of a messaging conversation, UI module 220 may infer the notification data is a messaging type.

Rather than expending the computing resources that would be required to execute a stand-alone application to manage a user interface associated with notification data, UI module 220 may call on operating platform 228 to launch a new activity or system thread to handle the presentation and user interactions with an auto-generated application GUI view. Said differently, UI module 220 may cause operating platform 228 to create a new system thread or so-called "activity" for each application GUI view that UI module 220 causes to be output for display at PSD 212. Each application GUI view may be output for display during execution of the new system thread.

By launching a new activity or thread instead of executing separate stand-alone application, UI module 220 can cause an auto-generated application GUI view to "launch" or be presented at UID 212 faster than a GUI of a stand-alone application. In addition, by launching new threads or activities, UI module 220 can cause auto-generated application GUI views to look and operate similar to an application, without all the computing overhead associated with executing an application. For instance, by launching a new activity, UI module 220 can bypass or forgo retrieving an executable file from memory or from off of a disk, running through a boot phase or start-up sequence, requesting and/or reserving space in memory to handle execution of the application, or performing any other operation that would typically be required to execute an application. In addition, by launching GUI views as activities or threads of operating platform 228, computing device 200 can avoid having to reserve storage space for an executable, or otherwise require a separate application install, to present a GUI for interacting with notification data. In other words, by launching an application GUI view as part of an already existing and executing operating platform 228, UI module 220 can cause PSD 212 to present application GUI views faster and by relying on less memory and other computing resources.

In addition to saving time and resources by forgoing application executables and instead using activities or system threads to support auto-generated application GUI views, UI module 220 may also quickly free-up computing resources when notifications are dismissed or an application GUI view or otherwise no longer needed. For example, after causing PSD 212 to present an application GUI view that has been auto-generated by UI module 220 from notification data, UI module 220 may receive a user input to exit the application GUI view. That is, a user may provide a swipe or other gesture at PSD 212 that UI module 220 may interpret as being an indication that the user no longer wants to view information about a notification.

Responsive to the user input, UI module 220 may cause operating platform 228 to terminate the new system thread that was launched for presenting the application GUI view, thereby releasing memory, processing cycles, and other computing resources. For example, UI module 220 may cause processor 240 to perform an instruction to delete the application GUI view from a memory of computing device 200. In this way, UI module 220 need not waste memory or storage (e.g., disk) space retaining specific executable code for presenting application hosted GUIs for interacting with notification data either when the application GUI view is being presented, or after presentation of the application GUI view has ceased. Instead, UI module 220 may automatically generate an application GUI view in real-time or near real-time (e.g., at the time that notification data is received or is to be presented), launch a new system thread to manage the user interactions with the application GUI view, and then kill or terminate the newly launched thread when interactions with the GUI view cease or a user otherwise stops needing the application GUI view. Computing device 200 may be able to operate using a lesser amount of storage space than other devices since computing device 200 may need not retain executable applications to present application style GUIs for interacting with notification data.

FIGS. 3A-3D are conceptual diagrams illustrating example application GUI views automatically generated by an example computing device based on a portion of notification data, in accordance with one or more aspects of the present disclosure. FIGS. 3A-3D illustrate user interfaces 314A-314D (collectively, user interfaces 314) and user interfaces 316A-316D (collectively, user interfaces 316). However, many other examples of graphical user interfaces may be used in other instances. Each of graphical user interfaces 314 and 316 may correspond to a graphical user interface displayed by computing devices 100 or 200 of FIGS. 1 and 2. FIGS. 3A-3D are described below in the context of computing device 100.

FIG. 3A illustrates an example of user interfaces that may be displayed by computing device 100 in response to receiving a photo type notification data (e.g., a message notification with a graphical image or digital photo as a portion of content). Computing device 100 may display user interface 314A as a graphical alert or graphical indication to the receipt of the photo type notification data. As shown in FIG. 3A, user interface 314A includes a notification icon (e.g., associated with the sender of the notification data), a title/name (e.g., the user name of the sender), text content (e.g., body of a brief message accompanying the photo data).

After presenting user interface 314A, and either automatically (e.g., after a brief time out) or as a response to receiving user input at PSD 112, computing device 100 may present user interface 316A including application GUI view 318A-1 through application GUI view 318A-5 (collectively, "application GUI views 318A"). For example, UI module 120 may dissect the photo notification data into multiple portions of data and select a template GUI view for each portion of data. Then, computing device 100 may populate the fields of the selected template GUI views with the portions of notification data to generate individual application GUI views 318A.

Application GUI view 318A-1 represents a summary view and includes the title/name portion of the photo notification data, the brief message portion, etc. Computing device 100 may display GUI view 318A-1 and then after detecting a scrolling input (e.g., a gesture at PSD 112), computing device 100 may present in sequential order, GUI views 318A-2, 318A-3, and 318A-4.

Application GUI views 318A-2 and 318A-3 each represent photo views and include respective image portions contained within the photo type notification data. In some examples, computing device 100 may populate the one or more fields of a template GUI view with the portion of the notification data after first formatting the portion of the notification data to fit a size of a screen of the display component. For example, UI module 120 may determine a size of PSD 112 and a size of a respective image portion contained within the photo type notification data. When automatically generating GUI views 318A-2 and 318A-3, UI module 120 may resize the respective image portions to fit the size of PSD 112 by, for example, stretching, shrinking, or cropping the respective image portions.

In some examples, the system activity or thread that UI module 220 generates for handling the presentation of application GUI views 318A may also facilitate user interactions with the notification data. For example, a user may input a spread gesture at PSD 112 when presenting GUI view 318A-3. In response to the spread gesture, computing device 100 may cause PSD 112 to present application GUI view 318A-5 which shows the respective photo portion from GUI view 318A-4 in expanded view. Conversely, in response to a pinch gesture, computing device 100 may cause PSD 112 to present the respective photo portion in a shrunken or reduced view. The system activity or thread that UI module 120 generates for handling the presentation of application GUI views 318A may also respond to other types of gestures or inputs (e.g., voice, etc.) for enabling user interaction with the notification data.

Application GUI view 318A-4 represents an action view and includes two or more selectable elements for initiating an action associated with the notification data. Computing device 100 may determine, based on the notification data, an action associated with the portion of the notification data, and insert a selectable element associated with the action into the application GUI view. For example, UI module 120 may cause GUI view 318A-4 to include a "share" action for sending the photo type notification data to a computing device, server, computing system, of another user, and an "open on phone" action for sending the photo type notification data for presentation at a different computing device of the user. UI module 120 may determine different actions for other types of notification data and insert selectable elements for initiating the action within automatically generated GUI views being presented at PSD 112.

Figure 3B:
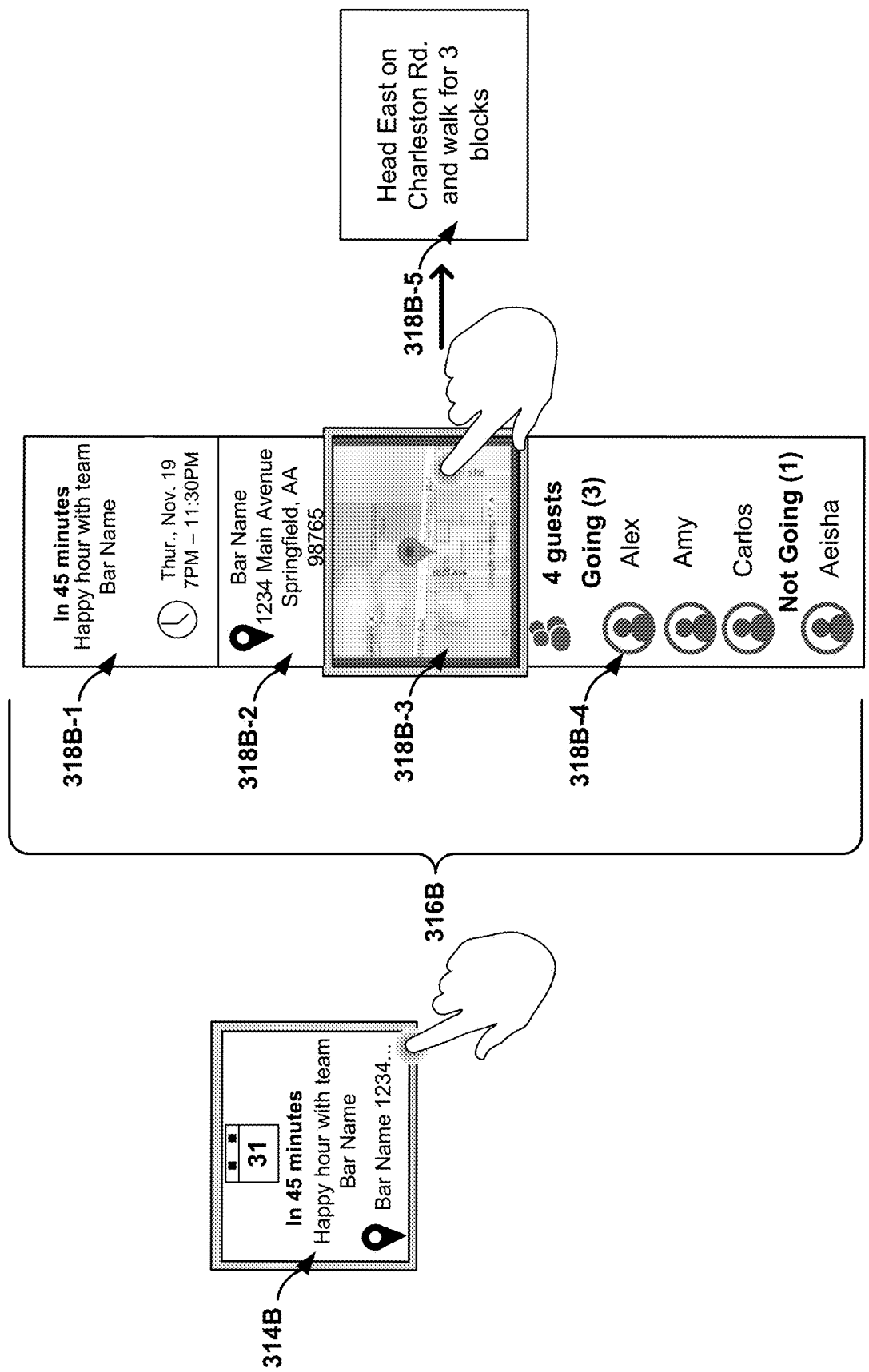

FIG. 3B illustrates an example of user interfaces that may be displayed by computing device 100 in response to receiving a calendar or reminder type notification data (e.g., a calendar notification alerting a user to a scheduled meeting, appointment, or event—in this case, a happy hour with co-workers of the user). Computing device 100 may display user interface 314B as a graphical alert or graphical indication to the receipt of the calendar type notification data. As shown in FIG. 3B, and similar to user interface 314A, user interface 314B includes a notification icon, a title/name, and text content (e.g., location information from the calendar data).

After presenting user interface 314B, computing device 100 may present user interface 316B including application GUI view 318B-1 through application GUI view 318B-5 (collectively application GUI views 318B). For example, UI module 120 may identify multiple portions of calendar notification data that are suitable for a separate application GUI view and select a template GUI view for each portion of data. Computing device 100 may populate the fields of the selected template GUI views with the portions of notification data to generate individual application GUI views 318B.

Application GUI view 318B-1 represents a summary view and includes the title/name portion of the photo notification data, a text portion, time and date information, etc. Computing device 100 may display any of GUI view 318B and then after detecting a scrolling input (e.g., a swipe up gesture at PSD 112), computing device 100 may present in sequential order, GUI views 318B-2, 318B-3, and 318B-4.

Application GUI views 318B-2 represents an address view showing the entire location or address of the calendar event. Application GUI view 318B-4 represents a participant or invitee view showing all the guests invited to the calendar event, status (e.g., whether each accepted or declined), as well as respective names of each invited guest.

Application GUI view 318B-3 represents a combination map and action view including a graphical image of a map of the location of the event. In response to detecting a user input at a location of PSD 112 at which application GUI view 318B-3 is displayed, the system activity driving user interface 316B may begin providing navigational directions to the location of the event and presenting the navigation directions as GUI view 318B-5.

Figure 3C:
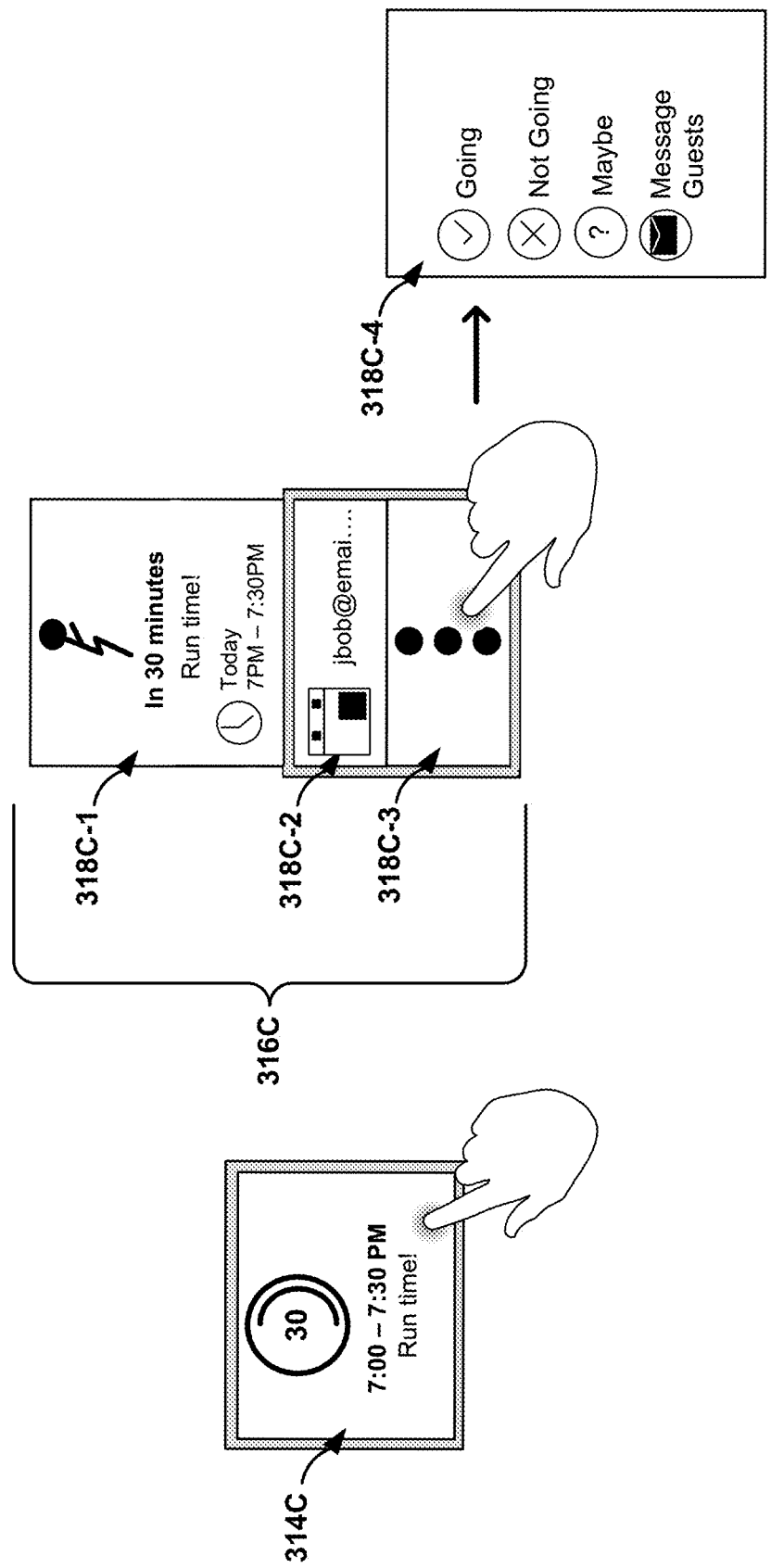

FIG. 3C illustrates another example of user interfaces that may be displayed by computing device 100 in response to receiving a calendar or reminder type notification data (e.g., a calendar notification alerting a user to a scheduled meeting, appointment, or event—in this case, a group run with friends of the user). Computing device 100 may display user interface 314C as a graphical alert or graphical indication to the receipt of the calendar type notification data. As shown in FIG. 3C, and similar to user interface 314A and 314B, user interface 314C includes a notification icon, a title/name, and text content (e.g., time information from the calendar data). In the example of FIG. 3C, the notification icon is a countdown timer indicating the amount of time remaining until the start of the event.

After presenting user interface 314C, computing device 100 may present user interface 316C including application GUI view 318C-1 through application GUI view 318C-3 (collectively application GUI views 318C). For example, UI module 120 may identify multiple portions of calendar notification data that are suitable for a separate application GUI view and select a template GUI view for each portion of data. Computing device 100 may populate the fields of the selected template GUI views with the portions of notification data to generate individual application GUI views 318C.

Application GUI view 318C-1 represents a summary view and includes the title/name portion of the photo notification data, a text portion, time information, etc. Computing device 100 may display any of GUI view 318C and then after detecting a scrolling input (e.g., a swipe up gesture at PSD 112), computing device 100 may present in sequential order, GUI views 318C-2 and 318C-3. Application GUI view 318C-2 represents a participant or invitee view showing all the guests invited to the calendar event, as well as respective names of each invited guest.

Application GUI view 318C-3 represents a hidden action application GUI view and application GUI view 318C-4 represents an unhidden action application GUI view. UI module 120 may determine one or more secondary actions associated with a portion of notification data and insert a respective selectable element associated with each of the one or more secondary actions into a location of application GUI view 318C-4. In response to detecting a user input at a location of PSD 112 at which application GUI view 318C-3 is displayed, the system activity managing interactions with user interface 316C may cause PSD 112 to present GUI view 318C-4 which is an automatically generated application GUI view that includes a group of selectable elements associated with actions of the notification data.

An action of notification data may be an action or function that could be performed on the notification data. A secondary action is one that may be performed on the notification data which is not frequently used enough to warrant being displayed as a primary action. Computing device 100 may cause "primary actions" associated with notification data (e.g., frequently performed actions or functions associated with the notification data) to be presented as prominent features in one of the initial GUI views being displayed as part of a user interface and computing device 100 may cause "secondary actions" to be displayed in a hidden GUI view until user input is detected for un-hiding the secondary actions.

Figure 3D:
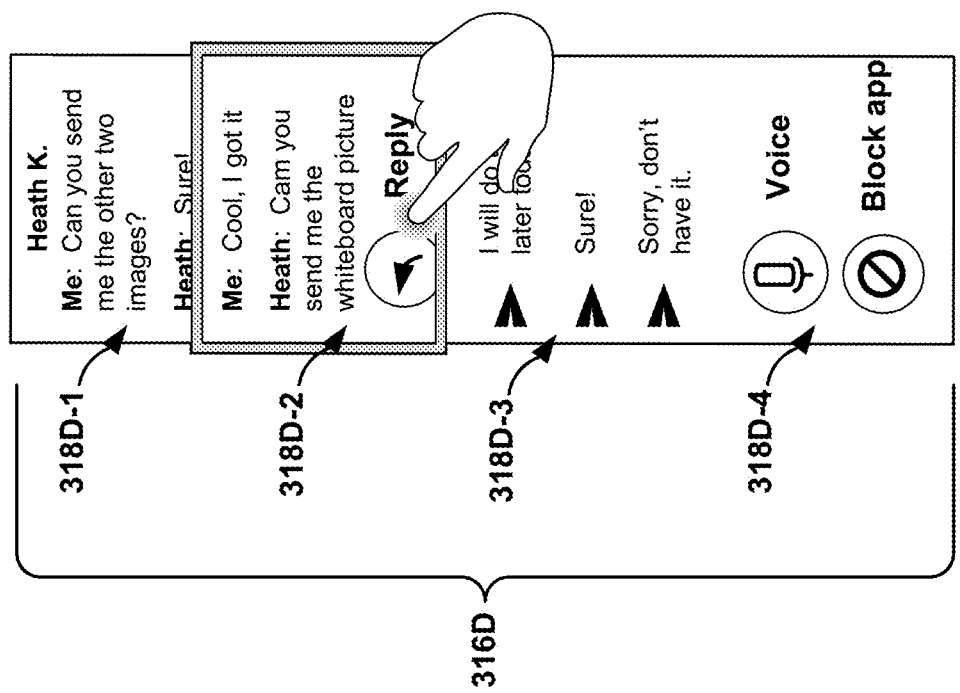
Figure 3D:
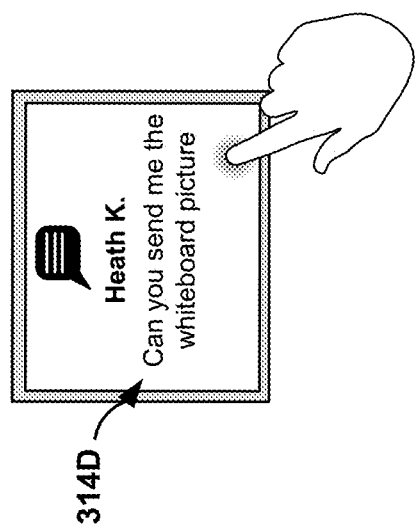

FIG. 3D illustrates an example of user interfaces that may be displayed by computing device 100 in response to receiving a message type notification data (e.g., a message notification alerting a user to a message received by a messaging account of computing device 100). Computing device 100 may display user interface 314D as a graphical alert or graphical indication to the receipt of the message type notification data. As shown in FIG. 3D, and similar to user interfaces 314A-314C, user interface 314D includes a notification icon, a title/name, and text content (e.g., a body of the message).

After presenting user interface 314D, computing device 100 may present user interface 316D including application GUI view 318D-1 through application GUI view 318D-4 (collectively application GUI views 318D). For example, UI module 120 may identify multiple portions of message notification data that are suitable for a separate application GUI view and select a template GUI view for each portion of data. Computing device 100 may populate the fields of the selected template GUI views with the portions of notification data to generate individual application GUI views 318D.

Computing device 100 may determine, based on the notification data, a primary action associated with the portion of the notification data, and insert a selectable element associated with the primary action into a location of the application GUI view that is visible when the application GUI view initially replaces the graphical alert. For example, UI module 120 may cause PSD 112 to present application GUI view 318D-2 in response to detecting the input at user interface 314D. Application GUI view 318D-1 represents a summary view and includes body of the message received with the notification data. Included within application GUI view 318D-2 is graphical element for invoking a primary action associated with message type notification data, e.g., a reply action. In this way, UI module 120 may cause user interface 316D to display GUI view 318D-2 first with a selectable element for invoking a most likely action to be taken against the notification data.

Computing device 100 may sometimes receive notification data that has additional information or a pointer to a location either internal or external to computing device 100 which stores the additional information. UI module 120 may use the additional information provided by notification sender to further enhance the auto-generated application GUI view. For example, the additional information associated with a message type notification may include a message history.

Application GUI view 318D-1 represents a message history view showing all the recent messages in the conversation between the sender of the message type notification data and the user of computing device 100. Responsive to determining that the notification data is a messaging notification type, UI module 120 may insert, within a message history field of the application GUI view 318D-1, a portion of a recent conversation between a user of computing device 100 and a sender of a message associated with the notification data and output, for display as part of the application GUI view 318D-1, the portion of the recent conversation. A user of computing device 100, before replying, may provide a scroll down input to move GUI view 318D-2 out of view and move GUI view 318D-1 into view at PSD 112 so the user can recall the previous message content.

Application GUI view 318D-3 represents an auto-generated view showing several recommended responses or replies to the message of the notification data. In other words, UI module 120 may determine based on the message associated with the notification data, one or more reply messages (e.g., using one or more linguistic rules or machine learning techniques), cause PSD 112 to output, for display as one or more selectable elements of application GUI view 318D-3, the one or more reply messages. For example, UI module 120 may input the message received from notification data into a rules based system and receive as output one or more recommended reply messages. In some examples, UI module 120 may determine the one or more reply messages further based on the portion of a recent conversation. In other words, instead of always showing the exact same list of roughly a dozen touchable responses, computing device 100 may intelligently show responses that make sense based on the recent messages in the chat. For example, UI module 120 may input the message received from notification data as well as at least some of the additional information about recent messages into the rules based system and receive as output one or more recommended reply messages that are particularly relevant given the conversation history.

Lastly, application GUI view 318D-4 represents a secondary action view and includes one or more selectable elements for initiating an action associated with the notification data. Computing device 100 may determine, based on the notification data, an action associated with the portion of the notification data, and insert a selectable element associated with the action into the application GUI view. For example, UI module 120 may cause GUI view 318D-4 to include a "voice" action for enabling voice input or voice responses to the message of the notification data and a "block app" action for preventing future display of message based GUI views or specifically, block or otherwise prevent GUI views or notification alerts to messages from the sender of the notification data.

Figure 4:
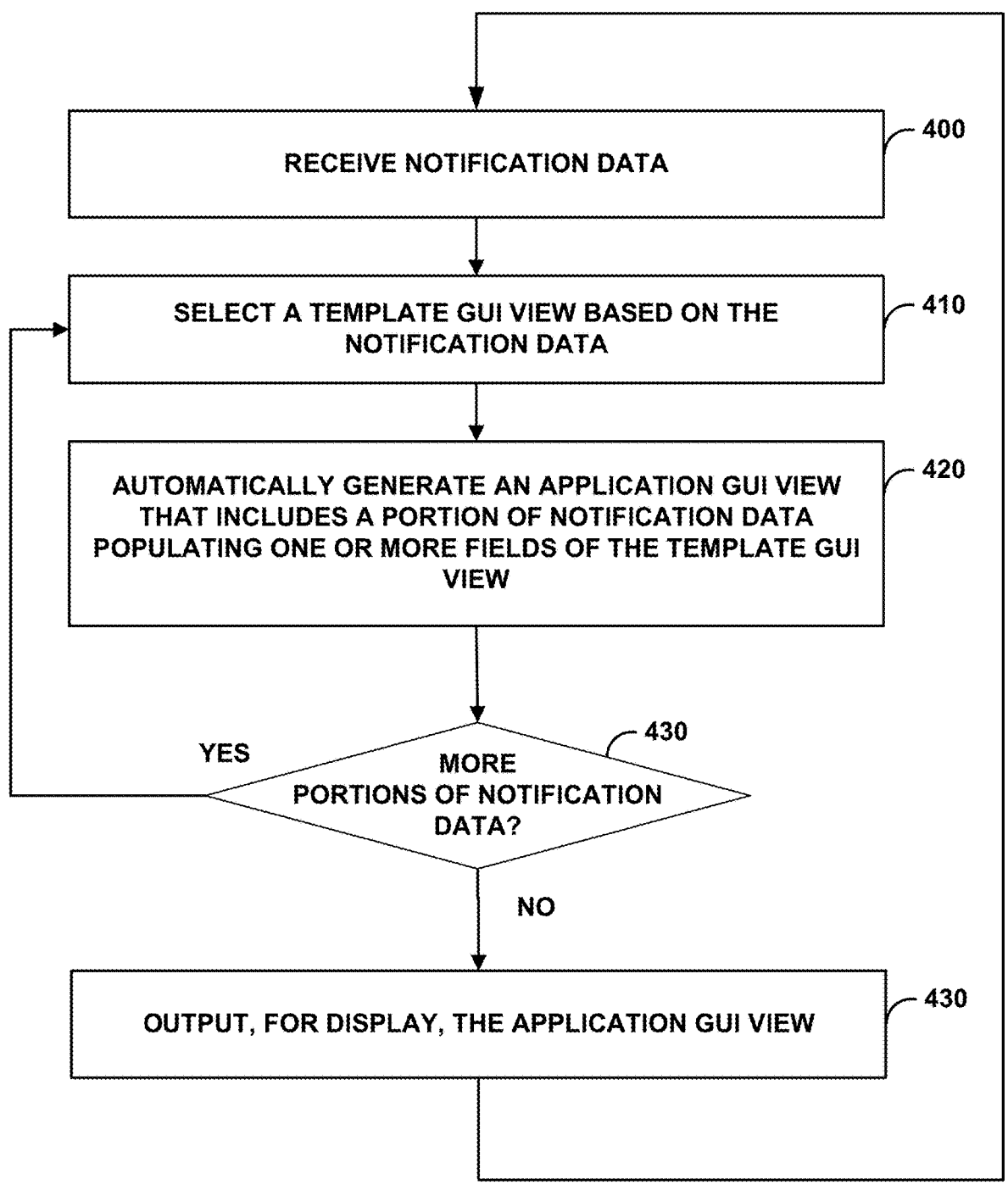
FIG. 4 is a flowchart illustrating example operations of an example computing device configured to automatically generate an application GUI view based on a portion of notification data, in accordance with one or more aspects of the present disclosure.

FIG. 4 is a flowchart illustrating example operations of an example computing device configured to automatically generate an application GUI view based on a portion of notification data, in accordance with one or more aspects of the present disclosure. The operations of FIG. 4 may be performed by one or more processors of a computing device, such as computing devices 100 of FIG. 1 or computing device 200 of FIG. 2. For purposes of illustration only, FIG. 4 is described below within the context of computing device 100 of FIG. 1.

In operation, computing device 100 may receive notification data (400). For example, notification module 122 may receive an indication of notification data from an application or service executing at or accessible to computing device 100. In response to detecting new notification data being added to the notification queue managed by notification module 122, UI module 120 may generate a graphical alert based on the notification data and automatically generate an application style GUI based on the notification data.

Computing device 100 may select a template GUI view based on the notification data (410). For example, UI module 120 may identify individual portions of notification data that have information that may populate one or more fields of a template GUI view. UI module 120 may map the portions of notification data to different template GUI views. For instance, if the notification data is a calendar or e-mail notification with a Matrix barcode for an electronic ticket, UI module 120 may select a QR template GUI view.

Computing device 100 may automatically generate an application GUI view that includes a portion of notification data included within one or more fields of the template GUI view (420). For example, UI module 120 may populate the QR template GUI view with a graphical image of the QR code that is contained in the notification. UI module 120 may format the QR code image as UI module 120 populates the QR field of the template GUI view so when displayed at PSD 112, the QR code is clearly visible.

Computing device 100 may determine whether the notification data includes more portions of data (430). In response to determining more than one portion of data (430, YES), computing device 100 may select, based on the notification data, a second template GUI view from the plurality of template GUI views. For instance, being that the notification data is a calendar or e-mail notification with a Matrix barcode for an electronic ticket, UI module 120 may select summary template GUI view. UI module 120 may automatically generate, from the one or more second portions of notification data, a second application GUI view that includes the one or more second portions of notification data included within one or more fields of the second template GUI view. For example, UI module 120 may populate the summary template GUI view with content or information about the event associated with the electronic ticket.

In response to determining that there are not more portions of data (430, NO), computing device 100 may output, for display, as a single interactive GUI, the second application GUI view in addition to the first application GUI view.

For example, UI module 120 may package the generated GUI views into a single rendering, launch a system activity to manage the interactions with the GUI views, and send instructions to PSD 112 to present the single rendering for display.

In some examples, responsive to receiving second notification data, computing device 100 may replace, the first application GUI view with a second automatically generated application GUI view that is generated from the second notification data. In other words, UI module 120 may in real-time, replace a GUI view being displayed for interacting with previous notification data with a GUI view for facilitating interactions with the new notification data. UI module 120 may terminate or "kill" the system thread managing the previous GUI view and launch a new system thread to manage the new GUI view. UI module 120 may repeatedly launch and cease activity threads as new notification data is received to allow a user to easily and quickly interact with the new notification data.

Clause 1. A method comprising: receiving, by a computing device, notification data; selecting, by the computing device, based on the notification data, a template graphical user interface (GUI) view from a plurality of template GUI views; automatically generating, by the computing device, from a portion of the notification data, an application GUI view that includes the portion of the notification data included within one or more fields of the template GUI view; and outputting, by the computing device, for display, the application GUI view.

Clause 2. The method of clause 1, wherein: the portion of notification data is a first portion of notification data; the template GUI view is a first template GUI view; the application GUI view is a first application GUI view; and the notification data includes one or more second portions of notification data in addition to the first portion of notification data, the method further comprising: selecting, by the computing device, based on the notification data, a second template GUI view from the plurality of template GUI views; automatically generating, by the computing device, from the one or more second portions of notification data, a second application GUI view that includes the one or more second portions of notification data included within one or more fields of the second template GUI view; and outputting, by the computing device, for display, as a single interactive GUI, the second application GUI view in addition to the first application GUI view.

Clause 3. The method of any one of clauses 1-2, wherein the notification data is first notification data and the application GUI view is a first application GUI view, the method further comprising: responsive to receiving second notification data, replacing, by the computing device, the first application GUI view with a second application GUI view that is automatically generated from the second notification data.

Clause 4. The method of any one of clauses 1-3, further comprising: outputting, by the computing device, for display, a system GUI of an operating system, wherein application GUI view is output for display as part of the system GUI.

Clause 5. The method of clause 4, wherein automatically generating the application GUI view further comprises executing, by the operating system, a new system thread, wherein the application GUI view is output for display as part of the system GUI during execution of the new system thread.

Clause 6. The method of clause 5, further comprising: receiving, by the computing device, a user input to exit the application GUI view; and responsive to the user input, terminating, by the computing device, the new system thread.

Clause 7. The method of clause 6, further comprising: further responsive to the user input, deleting, by the computing device, from memory, the application GUI view.

Clause 8. The method of any one of clauses 1-7, further comprising: determining, a notification type associated with the notification data, wherein the template GUI view is selected based on the notification type.

Clause 9. The method of clause 8, wherein the notification type is determined from at least one of: a flag associated with the portion of notification data; a style identifier associated with the portion of notification data; or a type identifier associated with the notification data.

Clause 10. The method of any one of clauses 8 or 9, wherein the notification type is at least one of: a message notification type; a ticket notification type; or a photo notification type.

Clause 11. A computing device comprising: a display component configured to display information; an input component configured to receive user input; at least one processor; a memory comprising instructions that, when executed, cause the at least one processor to: receive notification data; select, based on the notification data, a template graphical user interface (GUI) view from a plurality of template GUI views; and automatically generate, from a portion of the notification data, an application GUI view that includes the portion of the notification data included within one or more fields of the template GUI view; output, for display, using the display component, a graphical alert that the notification data was received; receive, via the input component, an indication of user input associated with the graphical alert; and responsive to receiving indication of the user input, replace the graphical alert with the application GUI view.

Clause 12. The computing device of clause 11, wherein the computing device is a first computing device and the notification data is received from an application executing at a second computing device.

Clause 13. The computing device of clause 12, wherein the first computing device is a wearable device or an automotive device and the second computing device is a mobile telephone, laptop computer, or tablet computing device.

Clause 14. The computing device of any one of clauses 11-13, wherein the instructions, when executed, cause the at least one processor to automatically generate, the application GUI view by at least: populating the one or more fields with the portion of the notification data after formatting the portion of the notification data to fit a size of a screen of the display component.

Clause 15. The computing device of any one of clauses 11-14, wherein the instructions, when executed, cause the at least one processor to automatically generate the application GUI view by at least: determining, by the computing device, based on the notification data, a primary action associated with the portion of the notification data; and inserting, by the computing device, a selectable element associated with the primary action into a location of the application GUI view that is visible when the application GUI view initially replaces the graphical alert.

Clause 16. The computing device of any one of clauses 11-15, wherein the instructions, when executed, further cause the at least one processor to automatically generate the application GUI view by at least: determining, by the computing device, based on the notification data, one or more secondary actions associated with the portion of the notification data; and inserting, by the computing device, a respective selectable element associated with each of the one or more secondary actions into a location of the application GUI view that requires a scrolling input before becoming visible when the application GUI view initially replaces the graphical alert.

Clause 17. A computer-readable storage medium comprising instructions that, when executed, cause at least one processor of a computing device to: receive notification data; select, based on the notification data, a template graphical user interface (GUI) view from a plurality of template GUI views; automatically generate, from a portion of the notification data, an application GUI view that includes the portion of the notification data included within one or more fields of the template GUI view; and output, for display, the application GUI view.

Clause 18. The computer-readable storage medium of clause 17, wherein the instructions, when executed, cause the at least one processor of the computing device to automatically generate the application GUI view by at least: responsive to determining that the notification data is a messaging notification type, inserting, within a message history field of the application GUI view, a portion of a recent conversation between a user of the computing device and a sender of a message associated with the notification data; and outputting, for display as part of the application GUI view, the portion of the recent conversation.

Clause 19. The computer-readable storage medium of clause 18, wherein the instructions, when executed, further cause the at least one processor of the computing device to automatically generate the application GUI view by at least: determining, based on the message associated with the notification data, one or more reply messages; and outputting, for display as one or more selectable elements of the application GUI view, the one or more reply messages.

Clause 20. The computer-readable storage medium of any one of clauses 18-19, wherein the instructions, when executed, further cause the at least one processor of the computing device to determine the one or more reply messages further based on the portion of a recent conversation.

Clause 21. A system comprising means for performing any one of the methods of clauses 1-10.

Clause 21. The computer-readable storage medium of clause 17, wherein the instructions, when executed, further cause the at least one processor of the computing device to perform any one of the methods of clauses 1-10.

Clause 22. The computing device of clause 11, wherein the instructions, when executed, further cause the at least one processor to perform any one of the methods of clauses 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    receiving, by a first computing device and from a second computing device executing a particular application, notification data associated with the particular application; and
    without executing the particular application at the first computing device:
        outputting, by the first computing device, for display, a graphical alert that the notification data was received;
        determining, by the first computing device, a first notification type associated with a first portion of the notification data and a second notification type associated with a second portion of the notification data, the first notification type different than the second notification type;
        selecting, by the first computing device, based on the first notification type of the first portion notification data, a first template graphical user interface (GUI) view from a plurality of template GUI views;
        selecting, by the first computing device, based on the second notification type of the second portion of the notification data, a second template GUI view from the plurality of template GUI views, the second template GUI view different than the first template GUI view;
        automatically generating, by the first computing device, a first application GUI view by populating one or more fields of the first template GUI view with the first portion of the notification data;
        automatically generating, by the first computing device, a second application GUI view by populating one or more fields of the second template GUI view with the second portion of the notification data;
        determining, by the first computing device, based on the notification data, a primary action associated with the first or second portion of the notification data;
        inserting, by the first computing device, a selectable element associated with the primary action at a location of the first or second application GUI view that is visible when outputting the first or second application GUI view;
        receiving, by the first computing device, an indication of a first user input that is associated with the graphical alert;
        responsive to receiving the indication of a first user input, replacing, by the first computing device, the graphical alert with the first application GUI view;
        while displaying the first application GUI view, receiving, by the first computing device, an indication of a second user input that is indicative of a command to display the second GUI view; and
        replacing, by the first computing device, the first application GUI view with the second application GUI view in response to receiving the second user input.

2. The method of claim 1, further comprising:
    outputting, by the first computing device, for display, a system GUI of an operating system, wherein the first application GUI view and the second application GUI view are output for display as part of the system GUI.

3. The method of claim 2, wherein automatically generating the first application GUI view further comprises executing, by the operating system, a new system thread, wherein the first application GUI view is output for display as part of the system GUI during execution of the new system thread.

4. The method of claim 3, further comprising:
    receiving, by the first computing device, a third user input, the third user input indicating a command to exit the second application GUI view; and
    responsive to the third user input, terminating, by the computing device, the new system thread.

5. The method of claim 4, further comprising:
    further responsive to receiving the third user input, deleting, by the computing device, from memory, the first and second application GUI view.

6. The method of claim 1, wherein the first notification type is determined from at least one of:
a flag associated with the first portion of the notification data;
a style identifier associated with the first portion of the notification data; or
a type identifier associated with the first portion of the notification data.

7. The method of claim 1, wherein the first notification type is at least one of:
a message notification type;
a ticket notification type; or
a photo notification type.

8. The method of claim 1, wherein determining the primary action comprises determining, by the first computing device, a most frequently performed action of a plurality of actions that are associated with the notification data.

9. A first computing device comprising:
a display component configured to display information;
an input component configured to receive user input;
at least one processor;
a memory comprising instructions that, when executed, cause the at least one processor to:
receive, from a second computing device executing a particular application, notification data associated with the particular application; and
without executing the particular application:
output, for display by the display component, a graphical alert that the notification data was received;
determine a first notification type associated with a first portion of the notification data and a second notification type associated with a second portion of the notification data, the first notification type different than the second notification type;
select, based on the first notification type of the first portion of the notification data, a first template graphical user interface (GUI) view from a plurality of template GUI views;
select, based on the second notification type of the second portion of the notification data, a second template GUI view from the plurality of template GUI views, the second template GUI view different than the first template GUI view;
automatically generate a first application GUI view by populating one or more fields of the first template GUI view with the first portion of the notification data;
automatically generate a second application GUI view by populating one or more fields of the second template GUI view with the second portion of the notification data;
determine, based on the notification data, a primary action associated with the first or second portion of the notification data;
insert a selectable element associated with the primary action at a location of the first or second application GUI view that is visible when outputting the first or second application GUI view;
receive, via the input component, an indication of a first user input that is associated with the graphical alert;
responsive to receiving the indication of the first user input, replace the graphical alert with the first application GUI view;
while displaying the first application GUI view, receive an indication of a second user input that is indicative of a command to display the second GUI view; and
replace the first application GUI view with the second application GUI view in response to receiving the indication of the second user input.

10. The first computing device of claim 9, wherein the first computing device is a wearable device or an automotive device and the second computing device is a mobile telephone, laptop computer, or tablet computing device.

11. The first computing device of claim 9, wherein the instructions, when executed, cause the at least one processor to automatically generate the first application GUI view by at least:
populating the one or more fields with the first portion of the notification data after formatting the first portion of the notification data to fit a size of a screen of the display component.

12. The first computing device of claim 9, wherein the instructions, when executed, further cause the at least one processor to automatically generate the first application GUI view by at least causing the at least one processor to:
determine, based on the notification data, one or more secondary actions associated with the first or second portion of the notification data; and
insert a respective selectable element associated with each of the one or more secondary actions into a location of the first or second application GUI view that requires a scrolling input before becoming visible when the first application GUI view initially replaces the graphical alert.

13. The first computing device of claim 12, wherein execution of the instructions cause the at least one processor to determine the one or more secondary actions by at least causing the at least one processor to determine actions performed with less than a threshold frequency.

14. The first computing device of claim 9, wherein execution of the instructions further cause the at least one processor of the first computing device to:
automatically generate the first application GUI view and the second application GUI view by causing an operating system to execute a new system thread; and
output, for display, a system GUI of the operating system, the system GUI including the first application GUI view and the second application GUI view during execution of the new system thread.

15. The first computing device of claim 14, wherein execution of the instructions further cause the at least one processor of the first computing device to:
receive a third user input, the third user input indicating a command to exit the second application GUI view; and
responsive to the third user input, terminate the new system thread and delete the first and second application GUI view from memory.

16. A computer-readable storage medium comprising instructions that, when executed, cause at least one processor of a first computing device to:
receive, from a second computing device executing a particular application, notification data associated with the particular application;
without executing the particular application:
output, for display, a graphical alert that the notification data was received;
determine a first notification type associated with a first portion of the notification data and a second notification type associated with a second portion of the notification data, the first notification type different from the second notification type;

select, based on the first notification type of the first portion of the notification data, a first template graphical user interface (GUI) view from a plurality of template GUI views;

select, based on the second notification type of the second portion of the notification data, a second template GUI view from the plurality of template GUI views, the second template GUI view different than the first template GUI view;

automatically generate a first application GUI view by populating one or more fields of the first template GUI view with the first portion of the notification data;

automatically generate a second application GUI view by populating one or more fields of the second template GUI view with the second portion of the notification data;

determine, based on the notification data, a primary action associated with the first or second portion of the notification data;

insert a selectable element associated with the primary action at a location of the first or second application GUI view that is visible when outputting the first or second application GUI view;

receive, via the input component, an indication of a first user input that is associated with the graphical alert;

responsive to receiving the indication of the first user input, replace the graphical alert with the application GUI view;

while displaying the first application GUI view, receive an indication of a second user input that is indicative of a command to display the second GUI view; and replace the first application GUI view with the second application GUI view in response to receiving the indication of the second user input.

17. The computer-readable storage medium of claim 16, wherein the instructions, when executed, cause the at least one processor of the first computing device to automatically generate the first application GUI view by at least causing the at least one processor to:

responsive to determining that the notification data is a messaging notification type, insert, within a message history field of the first application GUI view, a portion of a recent conversation between a user of the computing device and a sender of a message associated with the notification data; and outputting, for display as part of the first application GUI view, the portion of the recent conversation.

18. The computer-readable storage medium of claim 17, wherein the instructions, when executed, further cause the at least one processor of the first computing device to automatically generate the first application GUI view by at least causing the at least one processor to:

determine, based on the message associated with the notification data, one or more reply messages; and output, for display as one or more selectable elements of the first application GUI view, the one or more reply messages.

19. The computer-readable storage medium of claim 18, wherein the instructions, when executed, further cause the at least one processor of the first computing device to determine the one or more reply messages further based on the portion of a recent conversation.

20. The computer-readable storage medium of claim 16, wherein execution of the instructions further cause the at least one processor of the first computing device to:

automatically generate the application GUI view by causing an operating system to execute a new system thread; and output, for display, a system GUI of the operating system, the system GUI including the application GUI view during execution of the new system thread.

\* \* \* \* \*